United States Patent

[11] 3,621,391

| [72] | Inventor | David E. Miller |
| | | Beverly, Mass. |
| [21] | Appl. No. | 852,050 |
| [22] | Filed | Aug. 21, 1969 |
| [45] | Patented | Nov. 16, 1971 |
| [73] | Assignee | General Electric Company |

[54] MEANS FOR INHIBITING FLUTTER IN A NUMERICAL DISPLAY
6 Claims, 5 Drawing Figs.

| [52] | U.S. Cl. | 324/99 D, 324/120, 340/324 R |
| [51] | Int. Cl. | G01r 17/06, G01r 19/26 |
| [50] | Field of Search | 324/99, 120, 99 D; 340/324, 347 A–347 D; 235/92 (65) |

[56] References Cited
UNITED STATES PATENTS

| 2,836,356 | 5/1958 | Forrest et al. | 324/99 X |
| 3,449,726 | 6/1969 | Kawamoto et al. | 340/324 X |
| 3,458,809 | 7/1969 | Dorey | 324/99 |
| 3,473,122 | 10/1969 | H0lt | 324/120 X |
| 3,483,468 | 12/1969 | Gaynor | 324/99 |

Primary Examiner—Rudolph V. Rolinec
Assistant Examiner—Ernest F. Karlsen
Attorneys—I. David Blumenfeld, Frank L. Neuhauser, Oscar B. Waddell and Joseph B. Forman ABSTRACT: Rapid oscillation between consecutive numbers displayed by a numerical display device is prevented by comparing an incoming digitally coded signal with one representing the numeral currently registered by the device. If the incoming signal corresponds to a numeral consecutive to the one being displayed, the system inhibits the registration of the new signal by the device. At predetermined intervals the comparison system is bypassed and the device is "updated" by allowing registration of new signals, regardless of their relationship to prior signals.

Inventor
David E. Miller
by S David Blumenfeld
His Attorney

| NUMERAL DISPLAYED | BIT NO. | | | |
|---|---|---|---|---|
| | 1 | 2 | 3 | 4 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

| TERMINAL | | | | OUTPUT |
|---|---|---|---|---|
| A | B | C | D | |
| 1 | 1 | 0 | 0 | 0 |
| 0 | 0 | 1 | 1 | 0 |
| 1 | 0 | 0 | 1 | 1 |
| 0 | 1 | 1 | 0 | 1 |

Inventor
David E. Miller
by David Blumenfeld
His Attorney

MEANS FOR INHIBITING FLUTTER IN A NUMERICAL DISPLAY

This invention relates to numerical display systems and, more particularly, to a method and means for arises the oscillation or "flutter" of numerals being displayed. It should be noted that while such systems are often referred very as digital display systems, the term numerical display system will be substituted therefor in the instant disclosure since the term "digital" is used in the specification to denote binary-coded signals used to transmit information from one portion of the system to another.

In presenting information in the form of discrete numerals, from a continuously varying electrical signal, a problem arises in the form of error resolution. The nature of the problem is that the quantity being measured may change by very small amounts, an amount less than the smallest change of which the numerical display is capable. Thus, the least significant numeral of the display is always subject to an error of plus or minus 1 unit. Since the error varies on a random basis with respect to time, the least significant numeral of the display may continuously alternate between consecutive numerals each time a new signal is received, not because the measured parameter is changing but because of this random error.

The net effect of this oscillation or "fluttering" of a digit can be disconcerting to an individual who is attempting to monitor a number of such displays. For example, in an aircraft instrument panel having a plurality of numerical display devices, a pilot must scan the devices periodically for information as to the quantities being monitored. The fluttering of the least significant numeral of the displays may not only prove disconcerting, but make it almost impossible for the individual to know what the displayed numbers are.

In the past, one solution to this problem has been to incorporate electrical or mechanical damping in the display system. In this manner, rapid change of a number is made impossible. However, while this approach eliminates flutter, a rapid change due to an actual change in quantity being monitored is also inhibited. A rapid response to changes in conditions monitored was thus necessarily sacrificed to prevent flutter. The present invention overcomes the problem of flutter without using full-time damping, allowing the display to be rapidly changed at predetermined intervals to reflect changes in the information supplied to the display system.

The present invention contemplates the production of digital signals in response to the state of some parameter. Typically, this may be achieved by frequency modulating a carrier wave in response to the magnitude of a parameter being measured and then sampling the F.M. wave for a fixed predetermined period of time. Because of the sampling which is required to quantize the F.M. wave, it is very seldom that a discrete whole number of cycles of the modulated frequency will be encompassed by the sampling period. Usually, a fractional cycle is included in the sampling period, producing an anomalous output which results in the least significant bit (LSB) of the digital signal being subject to error. If the digital signals representing consecutive numbers to be displayed are always made to have their least significant bits (LSB's) of alternate polarities, it is possible to eliminate flutter by inhibiting any change in the display if the comparison between the new digital signal and the previous one indicates an odd numbered numeral change; (i.e. 1, 3, 5 ..). By preventing the display of odd numbered numeral changes fluttering, or random oscillation between adjacent numerals is prevented.

To achieve this end, means are provided to compare the polarities of the LSB's of the most recently sampled signal and the signal representing the numeral presently displayed. Coincidence of polarity of the LSB's, indicating either no numerical change, or a change by an even number of numerals, actuates a first gate. The signal generated by the first gate serves to actuate a second gate which in turn provides a latch signal which causes the new digital information to be transmitted to the display system. On the other hand, should the polarities of the LSB's differ, indicating an odd numbered numerical change (1, 3, 5 ..). the first gate would not generate the aforementioned signal and no latch signal would occur. The new digital information would then not be transmitted to the display system. To update the system and allow changes of odd numbers of numerals, the second gate is activated after several sampling periods to allow new information to be displayed, regardless of the polarity of the LSB. The updating function takes place at a relatively slow rate, allowing the display to be visually monitored without the presence of distracting fluttering.

It is therefore an object of this invention to provide apparatus to prevent objectionable fluttering of the characters of a numerical display system.

It is a further object of this invention to provide a method for inhibiting rapid changes of a display due to erratically oscillating digital input signals.

The subject matter of the invention is particularly pointed out and distinctly claimed in the concluding portion of the specification. For a complete understanding of the invention, together with further objects and advantages thereof, reference should be made to the following description taken in connection with the accompanying drawings in which:

Figure 1:
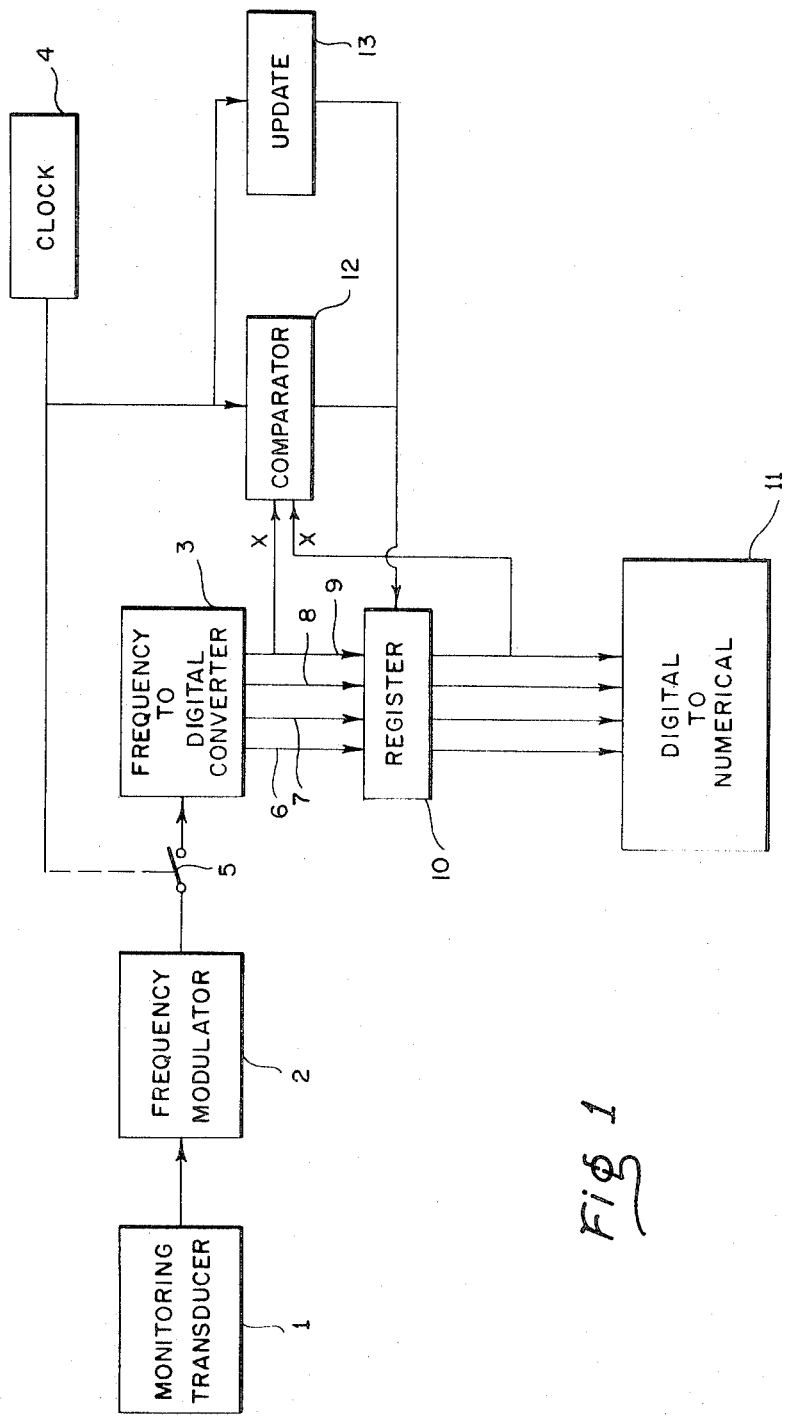
FIG. 1 is a block diagram of the basic functional components of the subject invention.

With reference to FIG. 1, a signal from a transducer 1, which might typically be used to monitor engine speed, oil pressure, fuel flow, etc., operates a frequency modulator 2 which then supplies a continuously variable frequency, which is the analog of the parameter to be monitored, to frequency-to-digital converter 3. A source of periodic signals, such as clock 4, operates a sampling switch 5 at a predetermined rate which corresponds to the highest tolerable rate of display change. The quantized output of the frequency-to-digital converter is in the form of parallel binary bits, with separate output lines 6–9 provided for each bit. In the disclosed embodiment, a total of ten characters are to be selectively displayed; this means that four "bits" must be available to provide at least ten permutations or binary signals.

Of the above-mentioned lines 6–9, line 9 is the line which carries the LSB of the binary signal. The digits are applied to the input terminals of a storage register 10 and the states of the output terminals of the register represent the binary number corresponding to the character, displayed by digital-to-numerical display device 11.

The LSB of the most recently generated binary number, indicated by X, is also supplied to one input of comparator 12. The LSB of the binary number representing the character currently displayed, and indicated by X* is also supplied to one input of comparator 12. The LSB of the binary X* is directed to the other input of comparator 12. Upon sensing the coincidence of the polarities of LSB's X and X*, comparator 12 transmits a "latch" or transfer signal to input L of register 10. The catch signal causes register 10 to transfer the binary signals on lines 6 through 9 to digital-to-numerical display 11. Should the polarities not coincide, however, indicating that an odd number change has occurred, no latch signal occurs, and the register is not actuated.

Update system 13 is provided to allow new information on lines 6 through 9 to be transmitted periodically to digital-to-numerical display 11, regardless of the polarity of the new LSB. To accomplish this, update system 13 provides a latch signal after a predetermined number of clock pulses have been counted.

Due to the inherent error in the sampling of the modulated frequency, the LSB is only correct about half the time. For this reason, the LSB is susceptible to random variations which may cause the display to alternate between consecutive numerals each time the analog frequency is sampled. In order to prevent this unwanted arbitrary changing, or "flutter," the system of the subject embodiment inhibits all odd-numbered numeral changes.

Figures 2, 4, 5:
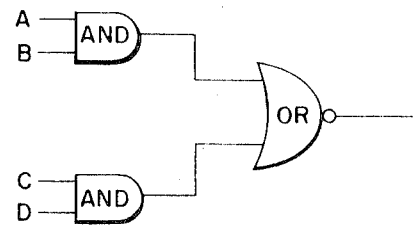
FIG. 2 is a binary coding suitable for use with the present invention.
FIG. 4 is a truth table illustrating the operation of the comparison gate.
FIG. 5 is a diagram of logic elements constituting a comparison gate as shown in FIG. 2.

As discussed above, digital signals, constituted by binary bits on the output lines 6 through 9 of frequency-to-digital converter 3, constitute the information necessary to select numbers 1 through 10 at digital-to-numerical numerical display 11. A binary code, such as that shown in FIG. 2, is selected so that the LSB's indicated in Column 4, alternate in polarity for consecutive numerals. For the display to present consecutive numerals, the polarity of the LSB must then necessarily reverse. By inhibiting a change of the display when the LSB indicated by X is of polarity different from that indicated by X*, the display is prevented from alternating between consecutive numbers, or fluttering. The display change is also inhibited by comparator 12 when the change would be any odd number of numerals, (i.e. 3, 5, 7, and 9) which are not due to random errors, but represent changes in the measured parameter. For this reason, update system 13 is provided to allow such a change at predetermined intervals.

Figure 3:
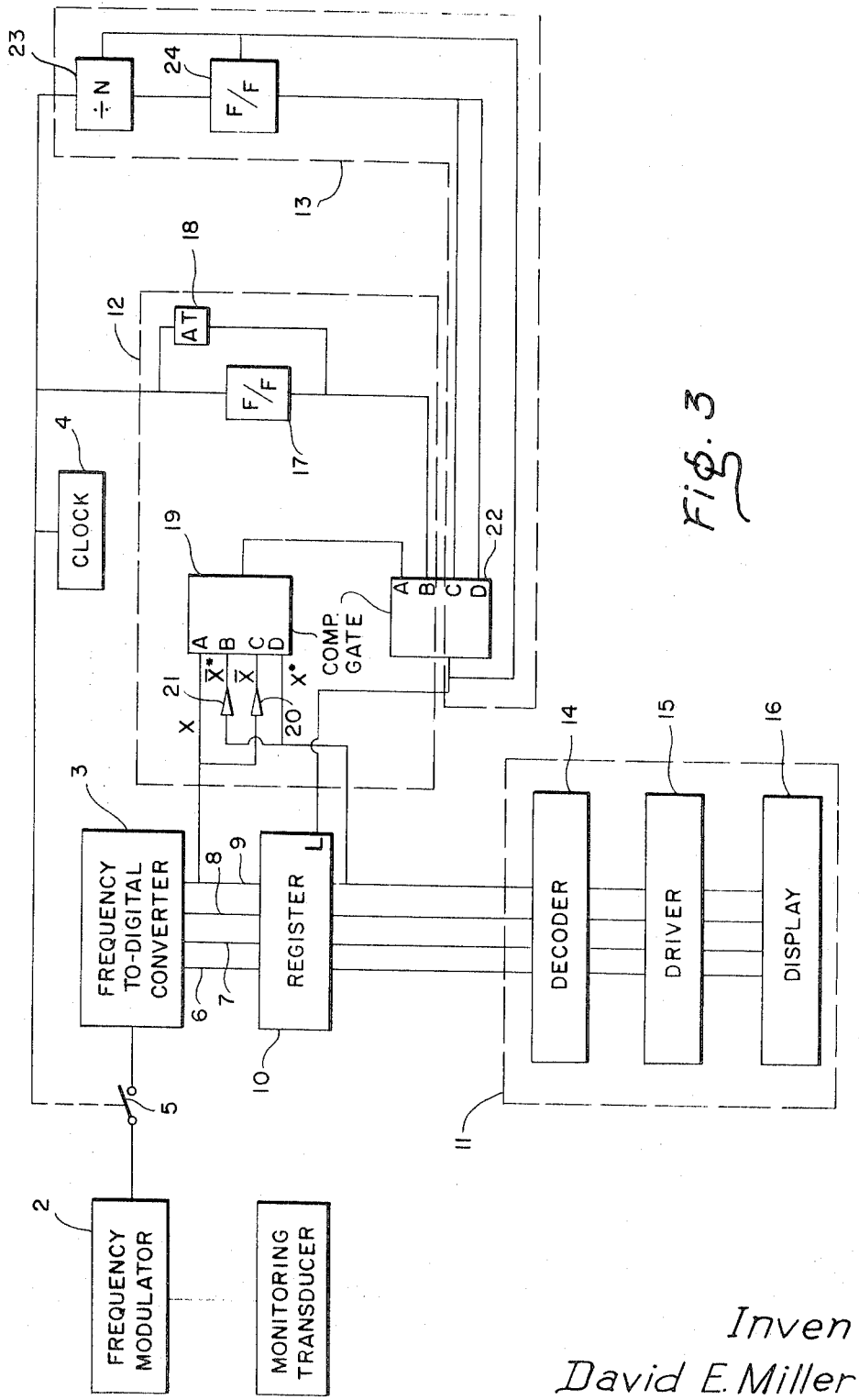
FIG. 3 is a second embodiment of the subject invention showing the components in further detail.

Referring now to FIG. 3, for a more detailed explanation of the system of FIG. 1, it is seen that the contents of register 10 are transmitted to decoder 14, which supplies signals to driver 15. Driver 15 in this embodiment has five output leads, one for each of five electromagnets provided for selectively displaying a desired character. By energizing one of the five leads with either a positive or negative polarity, ten combinations are provided for the selection of one of ten available numerals to display 16.

Clock 4, in addition to operating sampling switch 5, transmits a train of pulses to flip-flop 17. A time delay 18 is provided to reset flip-flop 17 after a predetermined period of time has elapsed.

Comparison gate 19 receives outputs X, X* (which represent the LSB's of the new and previous signals) at input terminals A and D, respectively. Inverters 20 and 21 are connected so as to provide inverted outputs $\bar{X}$ and $\bar{X}^*$ to terminals C and B, respectively. As will be seen from the truth table of FIG. 4, an output of binary "1" will occur upon the coincidence of the polarities of X and X*.

The output thus derived is transmitted to input A of comparison gate 22, which is shown to be identical to gate 19. Gate 22 provides a binary "0" output when terminals A and B are provided with coinciding, binary "1" outputs from gate 19 and flip-flop 17, or when terminals C and C are provided with a binary "1" output from flip-flop 24. The binary "0" output constitutes a "latch" signal, and when applied to latch terminal L of register 10, causes the register to transmit the binary signals on lines 6 through 9 to decoder 14, actuating driver 15 and display 16.

It will be noted that the system described above only allows the display to change by an even number of numerals. It is thus necessary to provide an "update" function to periodically allow the display to reflect the digital output of the frequency-to-digital converter, regardless of the polarity of the LSB of the incoming signal. The update system, indicated at 13, comprises counter 23, flip-flop 24 and gate 22. The counter and flip-flop are reset each time a latch signal is generated by gate 22, and a new count is begun.

After a predetermined number of clock pulses are counted, and assuming no coincidence of X and X* occurs to cause a new latch signal, flip-flop 24 is triggered by counter 23 to transmit a binary "1" to input terminals C and D of gate 22. By referring to FIG. 4, it will be seen that the coincidence of binary "1'" at terminals C and D causes the gate to output a binary "Q," which constitutes a latch signal. The binary signal now on lines 6 through 9 is transferred to the digital-to-numerical display, the counter 23 and flip-flop 24 reset, and the update system recycles.

FIG. 5 shows a preferred embodiment of logic elements constituting both comparison gates 19 and 22. A pair of AND gates, each having two input terminals, transmit their output signals to the two input terminals of the OR gate. An inverter is operatively coupled to the OR gate output. Upon occurrence of high signal levels, or binary "1's," at both input terminals of either AND gate, the gate transmits a similar binary "1" to the input terminal of the OR gate to which it is coupled. In response to a binary "1" at either or both of its input terminals, the OR gate transmits a binary "1" to the inverter, which transforms it to a low-level signal, or binary "0." Lack of binary "1's" at both input terminals of either AND gate results in only binary "0's" at the input terminals of the OR gate. The OR gate then transmits only a binary "0" to the inverter which transforms it to a high-level or binary "1, " signal.

While this circuit is particularly well-adapted for use as comparison gate 22, it will be noted that its use as comparison gate 19 requires the use of inverters 20 and 21 to provide the X and X* inputs. These inverters are necessary in order to provide gate 19 with a pair of binary "1's," should the polarity of the coinciding LSB's be binary "0."

The truth table of FIG 4 sets forth the operation of the circuit. It will be seen that upon the coincidence of binary "1's, " either at terminals A and D or at terminals B and C, the output of the system will be the binary "1" needed to actuate gate 22.

It will occur to those skilled in the art relationships between digital signals and numerals other than that shown by FIG. 2 are possible. For instance, the LSB's of binary signals corresponding to numbers 0 through 4 may be binary "L's, "while the LSB's of binary signals corresponding to numbers 5 through 9 would be binary "0's. "With this arrangement, the display may be inhibited from changing upon the occurrence of a coincidence of polarities between a newly sampled LSB and that of a signal already displayed. This could be simply accomplished with the present system by merely interchanging the inputs of terminals B and D of gate 19. Fluttering, however, would still occur between numerals 9 and 0 and 4 and 5, although large numerical changes could now be accommodated by the system.

Other codings and relationships may be devised to accomplish some degree of inhibition of unwanted fluttering, and while I have described a preferred embodiment above, I wish to have it understood that the appended claims are intended to cover all such modifications as fall within the true spirit and scope of my invention.

What is claimed as new and to be secured by U.S. Letters Patent is:

1. A numerical display system for visually displaying numerals indicative of a signal which is frequency modulated in response to a parameter to be measured, comprising:
 a. means for sensing the frequency modulated signal at first periodic intervals;
 b. means for converting each sensed frequency modulated signal into a corresponding binary signal;
 c. a display device;
 d. means for transmitting binary signals to said display device for effecting a numerical display indicative of a sensed frequency modulated signal;
 e. means for preventing flutter of displayed numerals by inhibiting single digit changes in said binary signals from effecting said numerical display including,
  means for comparing one of the bits of each succeeding binary signal corresponding to later sensed frequency modulated signals with a corresponding bit of the preceding binary signal to inhibit transmission of succeeding binary signals which have single digit changes, said comparing means producing an inhibiting signal for inhibiting transmission of said succeeding binary Signals to said display device by said transmitting means when the polarities of successive signals have a first predetermined relationship and producing an enabling signal for effecting transmission of succeeding binary signals to said display device by said transmitting means when the polarities of said signals have a second predetermined relationship;

f. means for coupling said inhibiting and enabling signals from said comparing means to said transmitting means to control transmission of said binary signals to said display device;

g. updating means for effecting transmission of binary signals to said display device at second periodic intervals, regardless of the relationship of said successive signals.

2. The numerical display system of claim 1 wherein said comparing means comprises:

a. a first comparison gate;

b. means for periodically producing signals at a predetermined rate;

c. a flip-flop having an input and an output, said input being coupled to said signal-producing means; and d. a second comparison gate for receiving signals from said first comparison gate and said flip-flop output and producing an output signal upon receiving said signals simultaneously.

3. The numerical display system of claim 1, wherein said updating means comprises:

a. means for periodically producing signals at a predetermined rate;

b. a flip-flop;

c. means for actuating said flip-flop upon sensing a predetermined number of said periodically produced signals;

d. comparison gate for receiving the output signal instituted by the actuation of said flip-flop and producing a latch signal in response thereto; and e. means for resetting said flip-flop means and said actuating means upon the occurrence of said latch signal.

4. Flutter eliminating means as recited in claim 3 wherein said comparator means comprises:

a. a first comparison gate for producing a first output signal upon detection of a predetermined relationship between said first digital signal and said second digital signal; and b. a second comparison gate for producing a second output signal upon detection of both said first output signal and an output signal from a periodically actuated signal source.

5. Flutter eliminating means as recited in claim 3 wherein said updating means produces an output signal after a predetermined number of signal comparing periods have occurred and is reset upon occurrence of said second output signal produced by said second comparison gate.

6. The numerical display system according to claim 1 including a register means for registering and storing the binary signals, said means having its input coupled to said converting means and its output to said display device, means coupling the input and output of said storage means to said comparing means for comparing corresponding bits of successive binary signals and producing said inhibiting and enabling signals, and means coupling said inhibiting and enabling signals from said comparing means to said storage means to control transmission of succeeding binary signals to said display device.

* * * * *